(12) United States Patent
Zheng et al.

(10) Patent No.: US 8,187,676 B2
(45) Date of Patent: May 29, 2012

(54) PROCESS FOR PREPARING ARTICLES HAVING ANTI-FOG LAYER BY LAYER COATING AND COATED ARTICLES HAVING ENHANCED ANTI-FOG AND DURABILITY PROPERTIES

(75) Inventors: Haipeng Zheng, St. Petersburg, FL (US); Joshua Hazle, St. Petersburg, FL (US)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 355 days.

(21) Appl. No.: 12/472,971

(22) Filed: May 27, 2009

(65) Prior Publication Data
US 2010/0304150 A1     Dec. 2, 2010

(51) Int. Cl.
*B05D 5/00* (2006.01)
*B05D 5/10* (2006.01)
*B05D 1/36* (2006.01)
(52) U.S. Cl. .................. 427/386; 427/387; 427/397.7
(58) Field of Classification Search .......... 424/386, 424/387, 397.7
See application file for complete search history.

(56) References Cited

U.S. PATENT DOCUMENTS

| 6,984,262 B2 | 1/2006 | King et al. | 106/287.22 |
| 2007/0104922 A1 | 5/2007 | Zhai et al. | 428/141 |
| 2008/0038458 A1 | 2/2008 | Gemici et al. | 427/180 |

FOREIGN PATENT DOCUMENTS

JP     2003010775     1/2003

OTHER PUBLICATIONS

Lim, "Evaluation of superhydrophilic polyelectrolyte multilayered films for anti-fogging applications," Thesis (M. Eng.)—Massachusetts Institute of Technology, Dept. of Materials Science and Engineering, issued 2006, retrieved from the Internet: http://dspace.mit.edu/handle/1721.1/37688?show=ful, retrieved on Jun. 22, 2010. (Abstract)
Gemici et al., "Hydrothermal treatment of nanoparticle thin films for enhanced mechanical durability," *Langmuir*, 24:2168-2177, 2008.
International Search Report and Written Opinion, issued in International application No. PCT/EP2010/057232, dated Jul. 13, 2010.
Lim, "Evaluation of superhydrophilic polyelectrolyte multilayered films for anti-fogging applications," Thesis (M. Eng.)—Massachusetts Institute of Technology, Dept. of Materials Science and Engineering, issued 2006, retrieved from the Internet: http://dspace.mit.edu/handle/1721.1/37688?show=ful, retrieved on Jun. 22, 2010. (Abstract).
Zhang et al., "Mechanically stable antireflection and antifogging coatings fabricated by the layer-by-layer deposition process and postcalcination," *Langmuir*, 24:10851-10857, 2008.

*Primary Examiner* — Gregory Delcotto
(74) *Attorney, Agent, or Firm* — Fulbright & Jaworski L.L.P.

(57) ABSTRACT

Disclosed are processes for preparing articles having anti-fog properties, comprising providing a substrate having at least one main surface coated with an intermediate coating obtained by applying and at least partially curing an intermediate coating composition comprising at least one monoepoxysilane and/or an hydrolyzate thereof and at least one polyepoxy monomer comprising at least two epoxy groups, forming onto said intermediate coating at least one bi-layer, and curing said at least one bi-layer by heating at a temperature of 150° C. or less at atmospheric pressure and in the absence of added water steam. Also disclosed are articles made and/or makeable by these processes.

20 Claims, 1 Drawing Sheet

PROCESS FOR PREPARING ARTICLES HAVING ANTI-FOG LAYER BY LAYER COATING AND COATED ARTICLES HAVING ENHANCED ANTI-FOG AND DURABILITY PROPERTIES

BACKGROUND OF THE INVENTION

1. Field of the Invention

This invention relates to a process for preparing an article bearing an improved anti-fog layer-by-layer coating and to the articles bearing an anti-fog layer-by layer coating obtained by said process, more particularly optical and ophthalmic articles, especially ophthalmic lenses for eyeglasses.

The invention is based on the use of a specific intermediate coating enhancing anti-fog properties and adhesion of said anti-fog layer-by-layer coating, along with a specific heating step of the layer-by-layer coating.

2. Description of Related Art

It is known in the art that a layer-by-layer (LbL) coating can be assembled on a substrate from species having opposite charges. More precisely, positively and negatively charged polyelectrolytes can be alternately deposited on a substrate.

For this purpose, at least two different polyelectrolyte solutions having opposite charges, or a polyelectrolyte solution and a nanoparticle solution having opposite charges, may be used to form the LbL coating.

As known in the art, a polyelectrolyte is a polymer having a substantial portion of its repeating units bearing an electrolyte group. These groups are ionic or ionizable groups, especially in aqueous solutions.

Other known LbL coatings include a plurality of bilayers alternately comprising oppositely charged nanoparticles.

By selecting the materials of the layers and the deposition process conditions, such films can be anti-reflective, hydrophilic or superhydrophilic, hydrophobic or superhydrophobic.

LbL coatings having hydrophilic properties may also have anti-fog properties.

US 2007/0104922 describes superhydrophilic LbL coatings that can be antireflective and anti-fog. i.a. poly(allylamine hydrochloride)/$SiO_2$ LbL coatings.

A disadvantage of the anti-fog LbL coatings is that such coatings exhibit generally poor mechanical properties, especially poor adhesion to organic substrates, either naked or coated by classical hard coats. Mechanical properties of LbL coatings have been increased by calcination treatment, generally at high temperature (typically 550° C.).

A disadvantage associated to this technique is that it cannot be applied on any organic substrates and is only adapted to substrates that can withstand high temperature like glass substrates.

In the article "Hydrothermal Treatment of Nanoparticle Thin Films for Enhanced Mechanical Durability" Z. Gemici et al., Langmuir 2008, 24, 2168-2177, a hydrothermal treatment implemented at around 125° C., of different LbL coatings is described in order to improve mechanical durability of these coatings and avoid delamination, especially on a polycarbonate (PC) substrate.

A typical example of a LbL coating is either a polymer-nanoparticle coating made alternatively from a positively charged poly(diallyidimethyl ammonium chloride) and negatively charged silica nanoparticles, or an all-nanoparticle coating assembled alternatively from positively charged 3-aminopropyl silane modified silica (or titania) nanoparticles and negatively charged silica nanoparticles. After a hydrothermal treatment, such LbL coating has improved abrasion resistance.

US 2008/0038458 describes a hydrothermal calcination of $TiO_2/SiO_2$ LbL coatings, typically at a pressure in the range of 10 psi to 30 psi at temperature less than 500° C.

One disadvantage of the technique, along with the necessity of using an autoclave, is that the hydrothermal treatment affects the anti-fog properties of the coating, as explained in US 2008/038458 paragraph [0046]: the coating can lose its anti-fog properties.

Consequently, it is desirable to provide a new and simple process of preparation of anti-fog LbL coatings having good or improved anti-fog properties, along with good mechanical properties such as improved adhesion to the substrate and/or improved abrasion resistance.

U.S. Pat. No. 6,984,262 describes a coating composition adapted to enhance the adhesion of a polymeric coating or film applied to a substrate.

This adhesive coating comprises at least one specific silane coupling agent, at least partial hydrolyzates thereof in a concentration greater than 25% and an adhesion enhancing amount of an epoxy-containing material comprising at least two epoxy groups.

There is no disclosure of an anti-fog LbL coating as the polymeric coating and no disclosure that the adhesive coating can improve the anti-fog properties of a LbL system.

SUMMARY OF THE INVENTION

An object of the invention is to improve the anti-fog properties of anti-fog LbL coatings.

Another object of the invention is to improve the mechanical durability of anti-fog LbL coatings, especially adhesion properties, for a wide range of substrates, especially organic substrates while keeping the deposition process of such anti-fog LbL coating as simple as possible.

A further object of the invention is to provide an anti-fog LbL coating having the improved anti-fog and mechanical properties mentioned above without concurrently decreasing its optical transparency in the visible range.

The present inventors have found that the anti-fog properties along with the durability of a LbL coating are improved by using a specific process for preparing an article having anti-fog properties, comprising:

a) providing a substrate having at least one main surface coated with an intermediate coating obtained by applying and at least partially curing an intermediate coating composition comprising at least one monoepoxysilane and/or a hydrolyzate thereof and at least one polyepoxy monomer comprising at least two epoxy groups, b) forming onto said intermediate coating at least one bi-layer obtained by:

b1—forming a first layer by applying a first layer composition on said intermediate coating, said first layer composition comprising at least one compound A having a first electric charge, b2—forming a second layer by applying a second layer composition directly on said first layer, said second layer composition comprising at least one compound B having a second electric charge which is opposite to said first electric charge, compounds A and B being independently chosen from polyelectrolytes, $SiO_2$ nanoparticles comprising ionic groups and $TiO_2$ nanoparticles comprising ionic groups, with the proviso that at least one of said first and said second layer comprises $SiO_2$ nanoparticles comprising ionic groups and/or $TiO_2$ nanoparticles comprising ionic groups, preferably SiO₂ nanoparticles comprising ionic groups, c) curing said at least one b-layer by heating at a temperature of 150° C. or less, preferably 140° C. or less, more preferably 130° C. or less, even better 120° C. or less, at atmospheric pressure and in the absence of added water steam.

Preferably, one of the layers of said at least one bi-layer comprises SiO₂ nanoparticles comprising ionic groups and the other layer of said at least one bi-layer comprises at least one oppositely charged polyelectrolyte.

In another preferred embodiment, the intermediate coating is coated with a plurality of bi-layers stacked onto each other, with the proviso that the second electrostatic charge of the at least one compound B comprised in the second layer of each bi-layer is opposite to the first electrostatic charge of the at least one compound A comprised in the first layer of the subsequent bi-layer.

When the intermediate coating is coated with a plurality of bi-layers stacked onto each other, compounds A (or B) in one bi-layer and compounds A (or B) in another bi-layer can be the same or different.

The invention also relates to an optical article comprising a substrate having an anti-fog LbL coating obtainable by implementing the above described process.

In one embodiment of the invention, the monoepoxysilane has preferably formula:

in which the R groups are identical or different and represent monovalent organic groups linked to the silicon atom through a carbon atom, Y is a monovalent organic group linked to the silicon atom through a carbon atom and containing one epoxy function, the X groups are identical or different and represent hydrolyzable groups or hydrogen atoms, and n' is 0 or 1.

The intermediate coating of the invention improves the adhesion between a substrate and the anti-fog LbL coating, but also improves or maintains the anti-fog performance of the outermost bi-layer coating, when the substrate is coated with several bi-layers according to the invention.

The intermediate coating can also be applied on hard coated lenses such as PC Airwear® lens substrates.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features and advantages of the present invention will become readily apparent to those skilled in the art from a reading of the detailed description hereafter when considered in conjunction with the accompanying drawings, wherein FIG. 1 exhibits the different deposition steps of the LbL coating and FIG. 2 exhibits the structure of the resulting LbL coating.

Figure 1:
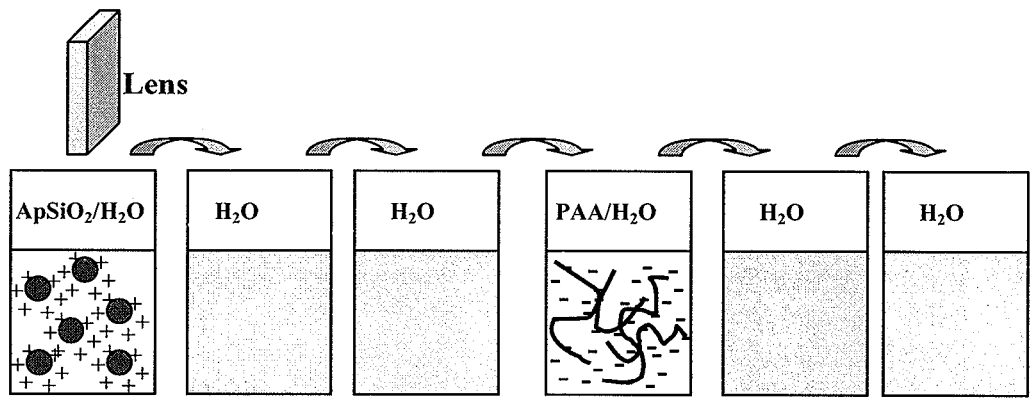

DETAILED DESCRIPTION OF THE INVENTION
AND PREFERRED EMBODIMENTS

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

When an optical article comprises one or more surface coatings, the phrase "to deposit a coating or layer onto the optical article" means that a coating or layer is deposited onto the outermost coating of the optical article, i.e. the coating which is the closest to the air.

A coating that is "on" a side of a lens is defined as a coating that (a) is positioned over that side, (b) need not be in contact with that side, i.e., one or more intervening coatings may be disposed between that side and the coating in question, and (c) need not cover that side completely.

The optical article prepared according to the present invention is a transparent optical article, preferably a lens or lens blank, and more preferably an ophthalmic lens or lens blank. The optical article may be coated on its convex main side (front side), concave main side (back side), or both sides using the process of the invention.

Herein, the term "lens" means an organic or inorganic glass lens, comprising a lens substrate which may be coated with one or more coatings of various natures.

The lens substrate may be made of mineral glass or organic glass, preferably organic glass. The organic glasses can be either thermoplastic materials such as polycarbonates and thermoplastic polyurethanes or thermosetting (cross-linked) materials such as diethylene glycol bis(allylcarbonate) polymers and copolymers (in particular CR-39® from PPG Industries), thermosetting polyurethanes, polythiourethanes, polyepoxides, polyepisulfides, poly(meth)acrylates and copolymers based substrates, such as substrates comprising (meth)acrylic polymers and copolymers derived from bisphenol-A, polythio(meth)acrylates, as well as copolymers thereof and blends thereof. Preferred materials for the lens substrate are polycarbonates (PC) and diethylene glycol bis (allylcarbonate) polymers, in particular substrates made of polycarbonate.

The surface of the article onto which the intermediate coating will be applied may optionally be subjected to a pre-treatment step intended to improve adhesion, for example a high-frequency discharge plasma treatment, a glow discharge plasma treatment, a corona treatment, an electron beam treatment, an ion beam treatment, an acid or base treatment.

The intermediate coating used in the process of the invention may be deposited onto a naked substrate or onto the outermost coating layer of the substrate if the substrate is coated with at least one surface coating. Said at least one surface coating may be, without limitation, an impact-resistant coating (impact resistant primer), an abrasion and/or scratch resistant coating, a polarized coating, a photochromic coating or a dyed coating.

The impact-resistant coating which may be used in the present invention can be any coating typically used for improving impact resistance of a finished optical article. This coating generally enhances adhesion of the abrasion and/or scratch-resistant coating on the substrate of the finished optical article. By definition, an impact-resistant primer coating is a coating which improves the impact resistance of the finished optical article as compared with the same optical article but without the impact-resistant primer coating.

Typical impact-resistance primer coatings are (meth) acrylic based coatings and polyurethane based coatings, in particular coatings made from a latex composition such as a poly(meth)acrylic latex, a polyurethane latex or a polyester latex.

Polyurethane-polyester latexes are commercially available from ZENECA RESINS under the trade name Neorez® (e.g., Neorez® R-962, Neorez® R-972, Neorez® R-986, Neorez® R-9603) or BAXENDEN CHEMICALS, a subsidiary of WITCO Corporation, under the trade name Witcobond® (e.g., Witcobond® 232, Witcobond® 234, Witcobond® 240, Witcobond® 242).

The abrasion- and/or scratch-resistant coating which may be used in the present invention can be any coating typically used for improving abrasion- and/or scratch-resistance of a finished optical article as compared to a same optical article but without the abrasion- and/or scratch-resistant coating.

Preferred abrasion- and/or scratch-resistant coatings are (meth)acrylate based coatings and silicon-containing coatings. The latter are more preferred and are disclosed, for example, in French patent application FR 2702486, which is incorporated herein by reference.

The intermediate coating is prepared from an intermediate coating composition, which may be a solution or dispersion, both terms being merged in the present patent application. These terms refer to a mixture of components which generally is uniform at the macroscopic scale (visually) and are not related to a particular solubility state or particle size of said components.

Said curable intermediate composition comprises at least one monoepoxysilane and/or its hydrolyzate and at least one polyepoxy monomer.

Preferred monoepoxysilanes are di or tri alkoxysilanes bearing one epoxy group.

The monoepoxysilane is preferably a compound of formula:

in which the R groups are identical or different and represent monovalent organic groups linked to the silicon atom through a carbon atom, Y is a monovalent organic group linked to the silicon atom through a carbon atom and containing one epoxy function, the X groups are identical or different and represent hydrolyzable groups or hydrogen atoms, and n' is 0 or 1.

The X groups may independently and without limitation represent H, alkoxy groups —O—$R^1$, wherein $R^1$ preferably represents a linear or branched alkyl or alkoxyalkyl group, preferably a $C_1$-$C_4$ alkyl group, acyloxy groups —Q—C(O) $R^3$, wherein $R^3$ preferably represents an alkyl group, preferably a $C_1$-$C_6$ alkyl group, and more preferably a methyl or ethyl group, halogen groups such as Cl and Br, amino groups optionally substituted with one or two functional groups such as an alkyl or silane group, for example the $NHSiMe_3$ group, alkylenoxy groups such as the isopropenoxy group, trialkylsiloxy groups, for example the trimethylsiloxy group.

The X groups are preferably alkoxy groups, in particular methoxy, ethoxy, propoxy or butoxy, more preferably methoxy or ethoxy. In this case, compounds of formula I are alkoxysilanes.

The integer n' defines two groups of compounds I: compounds of formula $RYSi(X)_2$ and compounds of formula $YSi(X)_3$. Among these compounds, epoxysilanes having the formula $YSi(X)_3$ are preferred.

The monovalent R groups linked to the silicon atom through a Si—C bond are organic groups. These groups may be, without limitation, hydrocarbon groups, either saturated or unsaturated, preferably $C_1$-$C_{10}$ groups and better $C_1$-$C_4$ groups, for example an alkyl group, preferably a $C_1$-$C_4$ alkyl group such as methyl or ethyl, an aminoalkyl group, an alkenyl group, such as a vinyl group, a $C_6$-$C_{10}$ aryl group, for example an optionally substituted phenyl group, in particular a phenyl group substituted with one or more $C_1$-$C_4$ alkyl groups, a benzyl group, a (meth)acryloxyalkyl group, or a fluorinated or perfluorinated group corresponding to the above cited hydrocarbon groups, for example a fluoroalkyl or perfluoroalkyl group, or a (poly)fluoro or perfluoro alkoxy [(poly)alkyloxy]alkyl group.

The most preferred R groups are alkyl groups, in particular $C_1$-$C_4$ alkyl groups, and ideally methyl groups.

The monovalent Y group linked to the silicon atom through a Si—C bond is an organic group since it contains one epoxy function. By epoxy function, it is meant a group of atoms, in which an oxygen atom is directly linked to two adjacent carbon atoms or non adjacent carbon atoms comprised in a carbon containing chain or a cyclic carbon containing system. Among epoxy functions, oxirane functions are preferred, i.e. saturated three-membered cyclic ether groups.

Epoxysilanes compounds of formula (I) provide a highly cross-linked matrix. The preferred epoxysilanes have an organic link between the Si atom and the epoxy function that provides a certain level of flexibility.

The preferred Y groups are groups of formulae III and IV:

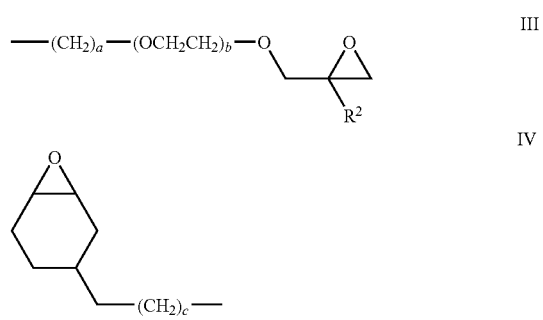

in which $R^2$ is an alkyl group, preferably a methyl group, or a hydrogen atom, ideally a hydrogen atom, a and c are integers ranging from 1 to 6, and b is 0, 1 or 2.

The preferred group having formula III is the γ-glycidoxypropyl group ($R^2$=H, a=3, b=0) and the preferred (3,4-epoxycyclohexyl)alkyl group of formula IV is the β-(3,4-epoxycyclohexyl)ethyl group (c=1). The γ-glycidoxyethoxypropyl group may also be employed ($R^2$=H, a=3, b=1).

Preferred epoxysilanes of formula I are epoxyalkoxysilanes, and most preferred are those having one Y group and three alkoxy X groups. Particularly preferred epoxytrialkoxysilanes are those of formulae V and VI:

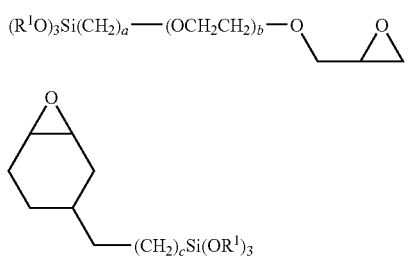

in which $R^1$ is an alkyl group having 1 to 6 carbon atoms, preferably a methyl or ethyl group, and a, b and c are such as defined above.

Examples of such epoxysilanes include but are not limited to glycidoxy methyl trimethoxysilane, glycidoxy methyl triethoxysilane, glycidoxy methyl tripropoxysilane, α-glycidoxy ethyl trimethoxysilane, α-glycidoxy ethyl triethoxysilane, β-glycidoxy ethyl trimethoxysilane, β-glycidoxy ethyl triethoxysilane, β-glycidoxy ethyl tripropoxysilane, α-glycidoxy propyl trimethoxysilane, α-glycidoxy propyl triethoxysilane, α-glycidoxy propyl tripropoxysilane, β-glycidoxy propyl trimethoxysilane, β-glycidoxy propyl triethoxysilane, β-glycidoxy propyl tripropoxysilane, γ-glycidoxy propyl trimethoxysilane, γ-glycidoxy propyl triethoxysilane, γ-glycidoxy propyl tripropoxysilane, 2-(3,4-epoxycyclohexyl) ethyltrimethoxysilane, 2-(3,4-epoxycyclohexyl) ethyltriethoxysilane. Other useful epoxytrialkoxysilanes are described in U.S. Pat. Nos. 4,294,950, 4,211,823, 5,015,523, EP 0614957 and WO 94/10230, which are hereby incorporated by reference. Among those silanes, γ-glycidoxypropyltrimethoxysilane (GLYMO) is preferred.

Preferred epoxysilanes of formula I having one Y group and two X groups include, but are not limited to, epoxydialkoxysilanes such as γ-glycidoxypropyl-methyl-dimethoxysilane, γ-glycidoxypropyl bis(trimethylsiloxy) methylsilane, γ-glycidoxypropyl-methyl-diethoxysilane, γ-glycidoxypropyl-methyl-diisopropenoxysilane, and γ-glycidoxyethoxypropyl-methyl-dimethoxysilane. When epoxy dialkoxysilanes are used, they are preferably combined with epoxytrialkoxysilanes such as those described above, and are preferably employed in lower amounts than said epoxytrialkoxysilanes.

The amount of monoepoxysilane present in the intermediate coating composition can be varied widely, but is preferably such that the theoretical dry extract weight of said monoepoxysilane is higher than 60% by weight, relative to the dry extract weight of the intermediate coating composition, more preferably higher than 70%, better higher than 80%, even better higher than 90% by weight. The upper limit is preferably 99.5% by weight.

The second essential component of the intermediate coating composition is a polyepoxy monomer, i.e. a monomer having at least 2 epoxy groups, and preferably 2 to 5 epoxy groups.

Non-limiting examples of the polyepoxy monomer comprising at least 2 epoxy groups are chosen from: glycerol polyglycidyl ether; diglycerol polyglycidyl ether; glycerol propoxylate triglycidyl ether (GPTE); trimethylolpropane triglycidyl ether; sorbitol polyglycidyl ether; poly(ethylene glycol)diglycidyl ether; poly(propylene glycol)diglycidyl ether; neopentyl glycol diglycidyl ether; N,N-diglycidyl-4-glycidyloxyaniline; N,N'-diglycidyltoluidine; 1,6-hexane diol diglycidyl ether; diglycidyl 1,2-cyclohexanedicarboxylate; diglycidyl bisphenol A; a polymer of diglycidyl bisphenol A; poly(bisphenol A-co-epichlorhydrin), glycidyl end-capped; diglycidyl of a hydrogenated bisphenol A propylene oxide adduct; diglycidyl ester of terephthalic acid; diglycidyl 1,2,3,6-tetrahydrophthalate; spiroglycoldiglycidyl ether; hydroquinone diglycidyl ether or mixtures thereof.

Other usable polyepoxy monomers are described in U.S. Pat. No. 6,984,262 that is incorporated herein by reference.

Preferably, the polyepoxy monomer does not comprise any silyl group, or their derivatives and more preferably does not comprise any Si atom. The polyepoxy monomer is preferably present in an amount ranging from 0.5 to 40%, preferably from 1 to 30%, better from 2 to 20% by weight relative to the dry extract weight of the intermediate coating composition.

Another additional compound which may be used in the intermediate coating composition comprises functionalized silane, siloxane or silicate (alkali metal salt of a Si—OH compound), or hydrolyzates thereof, different from the monoepoxysilanes cited above. They are generally substituted with one or more functional organic groups and form silica organosols and serve as binders. They may also act as adhesion promoters toward organic or mineral glass substrates.

As silicon containing binders may be cited silanes or siloxanes bearing an amine group such as amino alkoxysilanes, hydroxy silanes, alkoxysilanes, preferably methoxy or ethoxy silanes, ureidoalkyl alkoxysilanes, dialkyl dialkoxysilanes (for example dimethyl diethoxysilane), vinylsilanes, allylsilanes, (meth)acrylic silanes, carboxylic silanes, polyvinylic alcohols bearing silane groups, tetraethoxysilanes, and mixtures thereof.

After having been subjected to hydrolysis, the above cited organofunctional binders generate interpenetrated networks by forming silanol groups, which are capable of establishing bonds with the upper layer, namely the LbL coating and/or the underlying layer.

In one embodiment of the invention, the intermediate coating composition comprises at least one compound of formula:

$$R_nSi(Z)_{4-n} \tag{II}$$

or a hydrolyzate thereof, in which the R groups are identical or different and represent monovalent alkyl groups, the Z groups are identical or different and represent hydrolyzable groups or hydrogen atoms, and n is an integer equal to 0, 1 or 2, preferably 0, with the proviso that the Z groups do not all represent a hydrogen atom when n=0, and preferably do not all represent a hydrogen atom.

Compounds of formula II or their hydrolyzates may be used to improve the cross-linking of the intermediate coating obtained from the curable composition of the invention, thereby providing hardness and abrasion-resistance.

Silanes of formula II bear three to four Z groups directly linked to the silicon atom, each leading to an OH group upon hydrolysis and one or two monovalent organic R groups linked to the silicon atom. It is worth noting that SiOH bonds may be initially present in the compounds of formula II, which are considered in this case as hydrolyzates. Hydrolyzates also encompass siloxane salts.

The Z groups may represent hydrolyzable groups independently chosen from the hydrolyzable groups which have been previously cited when describing the X groups. Preferably, the Z groups are hydrolyzable groups which are identical or different.

The most preferred R groups are $C_1$-$C_4$ alkyl groups, such as methyl, ethyl, n-propyl, i-propyl, n-butyl, i-butyl, preferably methyl groups.

Most preferred compounds of formula II are those having formula $Si(Z)_4$. Examples of such compounds are tetraalkoxysilanes such as tetraethoxysilane $Si(OC_2H_5)_4$ (TEOS), tetramethoxysilane $Si(OCH_3)_4$ (TMOS), tetra(n-propoxy)silane, tetra(i-propoxy)silane, tetra(n-butoxy)silane, tetra(sec-butoxy)silane or tetra(t-butoxy)silane, preferably TEOS.

Compounds of formula II may also be chosen from compounds of formula $RSi(Z)_3$, for example methyl triethoxysilane (MTEOS).

Silanes present in the curable intermediate composition may be hydrolyzed partially or totally, preferably totally. Hydrolyzates can be prepared in a known manner, e.g. such as disclosed in FR 2702486 and U.S. Pat. No. 4,211,823. Hydrolysis catalysts such as hydrochloric acid or acetic acid may be used to promote the hydrolysis reaction over the condensation reaction.

Other additional components may be added in the composition, for example alkoxytitanates.

The other additional compounds (except fillers described hereafter), are generally comprised in the intermediate coating composition in an amount ranging from 1 to 20% by weight based on the total weight of the intermediate coating composition, preferably from 2 to 15%, more preferably from 2 to 10% and even better from 2 to 5%,.

In some embodiments, the intermediate coating composition does not comprise any additional compounds other than silanes and fillers. Preferably, the intermediate coating composition does not comprise any additional compounds other than silanes and fillers.

The intermediate coating composition may be cross-linked or cured owing to the presence of at least one cross-linking agent which preferably is soluble or dispersible in water. These cross-linking agents are well known and react with functional groups of the coating components, such as carboxyl or hydroxyl groups. They may be chosen from polyfunctional aziridines, methoxyalkylated melamine or urea resins, for example methoxyalkylated melamine/formaldehyde and urea/formaldehyde resins, epoxy resins, carbodiimides, polyisocyanates, triazines and blocked polyisocyanates. Preferred cross-linking agents are aziridines, in particular trifunctional aziridines.

The intermediate coating composition may also comprise a curing catalyst such as aluminum acetylacetonate $Al(AcAc)_3$, a hydrolyzate thereof or carboxylates of metals such as zinc, titanium, zirconium, tin or magnesium. Condensation catalysts such as saturated or unsaturated polyfunctional acids or acid anhydrides may also be used, in particular maleic acid, itaconic acid, trimellitic acid or trimellitic anhydride. Numerous examples of curing and/or condensation catalysts are given in "Chemistry and Technology of the Epoxy Resins", B. Ellis (Ed.) Chapman Hall, New York, 1993 and "Epoxy Resins Chemistry and Technology" $2^{nd}$ edition, C. A. May (Ed.), Marcel Dekker, New York, 1988.

The intermediate coating composition optionally comprises a catalytic amount of at least one curing catalyst, so as to accelerate the curing step. Examples of curing catalysts are photo-initiators that generate free radicals upon exposure to ultraviolet light or heat such as organic peroxides, azo compounds, quinones, nitroso compounds, acyl halides, hydrazones, mercapto compounds, pyrylium compounds, imidazoles, chlorotriazines, benzoin, benzoin alkyl ethers, diketones, phenones, and mixtures thereof. Initiators that can induce cationic cure can also be added to the intermediate coating composition.

In general, the catalysts and initiators described above are used according to the invention in an amount ranging from 0.01 to 10%, preferably from 0.1 to 5% by weight based on the total weight of the intermediate coating composition.

In preferred embodiments, the intermediate coating composition comprises fillers, generally nanoparticles (or nanocrystals), for increasing the hardness and/or the refractive index of the cured coating. The nanoparticles may be organic or inorganic, preferably inorganic. A mixture of both can also be used. Preferably, inorganic nanoparticles are used, especially metallic or metalloid oxide, nitride or fluoride nanoparticles, or mixtures thereof.

By "nanoparticles", it is meant particles which diameter (or longest dimension) is lower than 1 µm, preferably lower than 150 nm and still better lower than 100 nm. In the present invention, fillers or nanoparticles preferably have a diameter ranging from 2 to 100 nm, more preferably from 2 to 50 nm, better from 5 to 50 nm, and optimally from 10 to 20 nm.

Suitable inorganic nanoparticles are for example nanoparticles of aluminum oxide, silicon oxide, zirconium oxide, titanium oxide, antimony oxide, tantalum oxide, zinc oxide, tin oxide, indium oxide, cerium oxide, silicon nitride, magnesium fluoride or their mixtures.

It is also possible to use particles of mixed oxides or composite particles, for example those having a core/shell structure. Using different types of nanoparticles allows making hetero-structured nanoparticles layers.

Preferably, the nanoparticles are particles of aluminum oxide, tin oxide, zirconium oxide or silicon oxide, more preferably silicon oxide nanoparticles, better $SiO_2$ nanoparticles. Mineral fillers are preferably used under colloidal form, i.e. under the form of fine particles dispersed in a dispersing medium such as water, an alcohol, a ketone, an ester or mixtures thereof, preferably an alcohol.

When fillers are present, they are generally used in an amount ranging from 0.5 to 20% by weight of solid content based on the total weight of the intermediate coating composition, preferably from 1 to 15%, better from 1 to 4%. The amount of solid fillers generally ranges from 1 to 50% by weight, preferably from 2% to 40%, more preferably from 5 to 35% by weight relative to the theoretical dry extract weight of the intermediate coating composition.

In some embodiments, the intermediate coating composition does not comprise any filler such as nanoparticles.

The intermediate coating composition comprises at least one solvent, preferably a polar solvent, like water, an alcohol, or mixtures thereof, preferably a mixture of water and a water-miscible alcohol, e.g. methanol, ethanol, n-propanol, isopropanol, n-butanol, isobutanol, sec-butanol, tert-butanol, n-amylic alcohol, isoamylic alcohol, sec-amylic alcohol, tert-amylic alcohol, 1-ethyl-1-propanol, 2-methyl-1-butanol, 1-methoxy-2-propanol n-hexanol, cyclohexanol, ethyl cellosolve (monoethoxy ethylene glycol), and ethylene glycol.

It is also possible to add an appropriate amount of another hydrophilic organic solvent in said composition such as NMP, acetone, tetrahydrofuran, DMSO, DMAc, triethylamine or DMF.

The solvent or mixture of solvents may represent from 50 to 99% by weight, relative to the weight of the coating composition, preferably from 50 to 90%, more preferably from 60 to 90%.

The coating composition may also comprise at least one nonionic or ionic surfactant, i.e. anionic, cationic or amphoteric surfactant, to improve the wettability of the coating solution or the optical quality of the deposit. A particularly preferred class of surfactants comprises fluorinated surfactants, preferably anionic fluorinated surfactants.

Fluorinated surfactants are known and described generally in "Fluorinated Surfactants" by E. Kissa, Surfactants Science Series, Vol. 50 (Marcel Dekker, New York 1994). Fluorinated surfactants include perfluoroalkanoic acids and salts thereof, in particular perfluorooctanoic acids and salts thereof, such as ammonium perfluorooctanoic acid, fluorinated polyethers or perfluoropolyether surfactants such as disclosed in EP 1059342, EP 712882, EP 752432, EP 816397, U.S. Pat. Nos. 6,025,307, 6,103,843 and 6,126,849. Further fluorinated surfactants are disclosed in U.S. Pat. Nos. 5,229,480, 5,763,552, 5,688,884, 5,700,859,5,804,650, 5,895,799, WO 00/22002 and WO 00/71590. Fluorinated polyethers derived from hexafluoropropyleneoxide have been described in US 2005/096244. Another class of fluorinated surfactants includes fluorocarbon modified polysiloxane surfactants, e.g. polyalkyleneoxide-modified heptamethyltrisiloxane allyloxypolyethyleneglycol surfactant.

The surfactant or mixture of surfactants may represent from 0.001% to 5% by weight, relative to the weight of the intermediate coating composition.

The composition may also contain various additives conventionally used in polymerizable compositions, in conventional proportions. These additives include stabilizers such as antioxidants, UV light absorbers, light stabilizers, anti-yellowing agents, adhesion promoters, dyes, photochromic agents, pigments, rheology modifiers, lubricants, cross-linking agents, photo-initiators fragrances, deodorants and pH regulators.

The intermediate coating composition used in the process of the invention generally has a theoretical dry extract weight which preferably represents less than 50% of the total weight of the composition, and preferably ranging from 1 to 40%, even better from 2 to 30%, which includes both required compounds and optional compounds.

By "theoretical dry extract weight of a component in a composition," it is meant the theoretical weight of solid matter of this component in said composition. The theoretical dry extract weight of a composition is defined as the sum of the theoretical dry extract weights of each of its components. As used herein, the theoretical dry extract weight of compounds of formula I or II is the calculated weight in $R_{n'}YSi(O)_{(3-n')/2}$ or $R_{n'}Si(O)_{(4-n)/2}$ units, wherein R, Y, n, and n' are such as defined previously.

For other compounds which are not hydrolyzable, the weight taken into account for the calculation of the theoretical dry extract is their own weight.

The intermediate coating is formed at the surface of an optical article by liquid phase deposition or lamination according to any appropriate method, starting from the above described liquid intermediate coating composition. Application of said composition may be carried out, without limitation, by spin coating, dip coating, spray coating, brush coating, roller coating. Spin coating and dip coating are preferred.

After application of the intermediate coating composition onto the surface of the optical article, the composition may be dried or cured, if necessary, according to any appropriate method, for example drying with air, in an oven or by using a drier. Generally, a temperature of 50-130° C. is used. The curing time may be from 10 minutes to 5 hours. The drying/curing step comprises evaporation of the solvents and solidification of the intermediate coating composition.

Several successive depositions of intermediate coating layers according to the invention may be performed at the surface of the optical article. In this case, a single drying step of the whole LbL stack of intermediate coatings is preferably performed.

Thickness of the intermediate coating in the final optical article preferably ranges from 50 nm to 20 microns, more preferably from 100 nm to 10 microns, even more preferably from 50 nm to 8 microns. It appears that the improvement of anti-fog properties is better if the thickness of the cured intermediate coating is more than 130 nm, preferably more than 150 nm, more preferably more than 200 nm, even better more than 250 nm.

Once the intermediate coating has been applied and cured, the LbL coating is applied and cured.

In general, the LbL coating is made on a substrate by carrying out sequential adsorption of positively charged or negatively charged species by alternately dipping the substrate into coating solutions containing such species.

The excess or remaining solution after each adsorption step is rinsed with a solvent.

LbL coatings have been widely described in the prior art such as US 2008/0038458, US 2007/0104922, both patent applications being incorporated herein by reference.

A typical LbL process applied to prepare an anti-fog coating on a lens substrate is described hereafter and is shown in FIG. 1:

I. Both sides of a lens substrate are treated with corona or caustic solution;

II. The lens is first dipped in a solution comprising a first compound having a first electric charge, for example a polycation solution (the polycation generated from aminopropyl functionalized silica nanoparticles in FIG. 1, $ApSiO_2$), followed with an agitated rinsing step in two deionized (DI) water baths, and then dipped in a second solution comprising a second compound having a second electric charge which is opposite to said first electric charge, for example a polyanion solution (the polyanion generated from poly(acrylic acid) in FIG. 1, PAA), followed with an agitated rinsing step in two DI water baths. Thus a LbL coating with one bilayer of polycation/polyanion is assembled.

III. Process II is repeated for (n−1) times to get a LbL coating with n bilayers.

IV. The coated lens is finally cured at 100-120° C. for 1 h.

A polycation is a species comprising several cationic groups. A polyanion is a species comprising several anionic groups.

Figure 2:
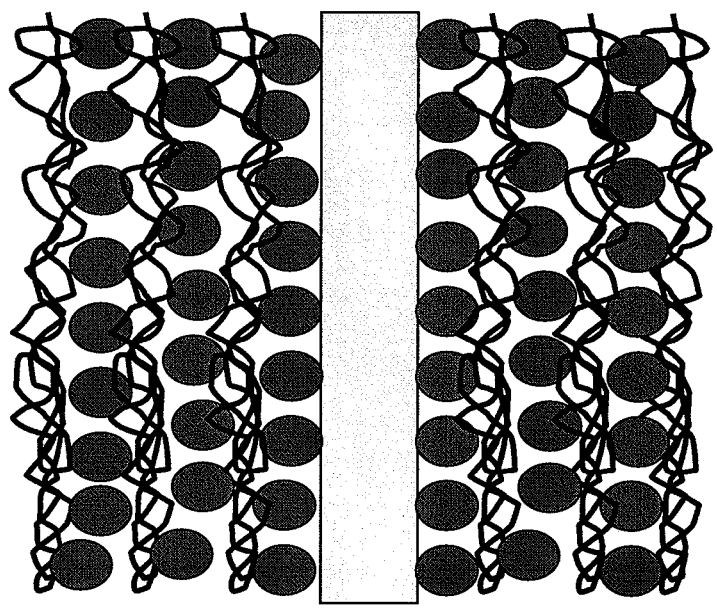

An example of a possible resulting structure is represented in FIG. 2: three bilayers of polycation/polyanion on both sides of a substrate made from the LbL process. The resulting coating is then written as: (polycation/polyanion)$_3$. When a coating is made of n bilayers, the resulting coating is (polycation/polyanion)$_n$.

The bilayers comprise alternated layers of polycations and polyanions.

In a first embodiment, $SiO_2$ nanoparticles comprising ionic groups are positively charged and the polyelectrolyte is negatively charged.

More preferably $SiO_2$ nanoparticles comprising ionic groups are obtained from nanoparticles functionalized by amino groups, preferably from 3-aminopropylsilane modified $SiO_2$ nanoparticles, (polycation).

Preferably, the negatively charged polyelectrolyte is obtained from a polymer chosen from polyacrylic acid, sulfonated polystyrene, sulfonated polyvinylic compounds and mixtures thereof.

In a second embodiment, $SiO_2$ nanoparticles comprising ionic groups are negatively charged and the polyelectrolyte is positively charged.

In this case, the polyelectrolyte is preferably obtained from a polymer chosen from poly(diallyldimethylammonium chloride), poly(allylamine hydrochloride), poly(4-vinylbenzyltrimethyl ammonium chloride) and mixtures thereof.

Non-limiting graphic formulae of polymers that can be used as polyelectrolytes for the formation of the LbL are mentioned hereafter:

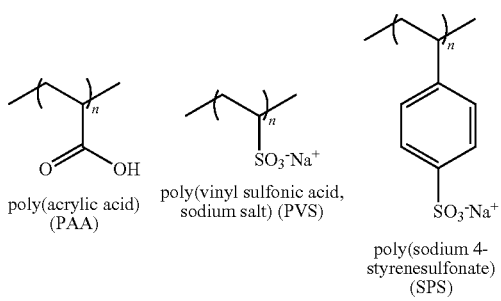

Negatively charged polyelectrolytes

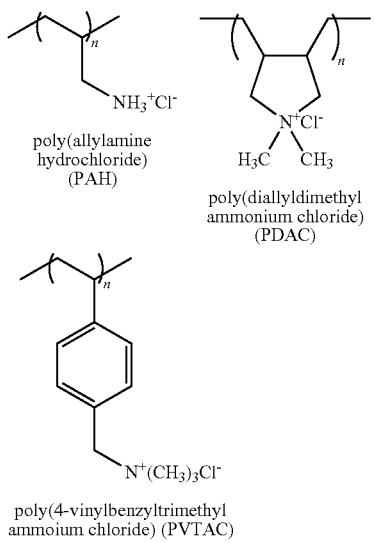

Positively charged polyelectrolytes

A rinsing step, preferably in an aqueous rinsing solution is implemented after deposition of each layer of the bi-layer or the bi-layer stack.

Preferably, said aqueous rinsing solutions have an acidic pH, preferably a pH lower than 5, more preferably lower than 4, for a LbL coating obtained from ApSiO$_2$ (aminopropyl functionalized silica nanoparticles) and PAA (poly(acrylic acid)).

Preferably, each layer, in a bi-layer comprising alternately oppositely charged species has a thickness preferably ranging from 5 to 40 nm, preferably 10 to 30 nm.

After the LbL coating has been applied, the LbL coating is submitted to a heating step at an atmospheric pressure at a temperature of 150° C. or less, preferably 140° C. or less, more preferably 130° C. or less, even better 120° C. or less.

The total thickness of the LbL coating, once heated, ranges preferably from 40 to 500 nm, more preferably from 50 to 200 nm, and even better from 10 to 30 nm.

By atmospheric pressure, it is encompassed a pressure that can slightly vary around 0.1 Mpa, typically from 0.08 to 0.12 MPa, preferably from 0.09 to 0.101325 Mpa.

The relative humidity during heating step is generally corresponding to ambient humidity, typically ranging from 40 to 60%, and preferably close to 55%.

According to the invention, there is no treatment of the LbL coating by water steam during the curing step of the bi-layers. In other words, there is no hydrothermal treatment of the LbL coating, contrary to the prior art previously mentioned above wherein a hydrothermal treatment of the substrate coated with the LbL is implemented in an autoclave.

The heating step of the LbL coating may be implemented using the same process of curing than the one used for the intermediate layer of the invention as previously described.

The invention also relates to an article bearing a LbL coating obtained by implementing the process as previously described.

The process of the invention can be used in the ophthalmic lens industry to prepare anti-fog lenses, but also for general anti-fog purpose in the field of photographic films, electronics or food packaging and imaging materials. Particular non limiting uses include windows, optically transparent screen for display devices and electromagnetic radiation shielding.

Its advantages are numerous and include applicability to most of substrates with good adhesion, in particular plastic substrates, and the production of optical articles.

The preferred optical articles do preferably not absorb light in the visible range (or little), which means herein that when coated on one side with the inventive coating, the optical article has a luminous absorption in the visible range due to the coatings of preferably 1% or less, more preferably less than 1%, and/or a relative light transmission factor in the visible spectrum, $T_v$, preferably higher than 90%, more preferably higher than 91%, and even more preferably higher than 92%. Preferably, both features are simultaneously satisfied and can be reached by carefully controlling thicknesses of the coatings. As used herein, a "transparent" optical article is an optical article having a $T_v$ higher than 90%, more preferably higher than 91%, and even more preferably higher than 92%. The $T_v$ factor is such as defined in the standard NF EN 1836 and corresponds to the 380-780 nm wavelength range.

In an alternative embodiment, the optical article may be tinted or dyed and absorb light in the visible range.

The final optical articles prepared according to the invention preferably have low haze characteristics. Haze is a measurement of the transmitted light scattered more than 2.5° from the axis of the incident light. The smaller the haze value, the lower the degree of cloudiness. The haze value of the present optical articles is preferably 3% or less, more preferably 1% or less, and better 0.5%.or less.

The present optical articles can be processed simply and at low temperature ($\leq 120°$ C.), using environment friendly solvents (alcohol or water/alcohol co-solvent). The present process is flexible and allows incorporation of other functional coatings onto the substrate.

Now, the present invention will be described in more detail with reference to the following examples. These examples are provided only for illustrating the present invention and should not be construed as limiting the scope and spirit of the present invention.

EXAMPLES

1. Testing Methods

The following test procedures were used to evaluate the optical articles prepared according to the present invention.

a) Dry Adhesion Test (Crosshatch Test)

Dry adhesion of the transferred coatings was measured using the cross-hatch adhesion test according to ASTM D3359-93, by cutting through the coatings a series of 5 lines, spaced 1 mm apart with a razor, followed by a second series of 5 lines, spaced 1 mm apart, at right angles to the first series, forming a crosshatch pattern comprising 25 squares. After blowing off the crosshatch pattern with an air stream to remove any dust formed during scribing, SCOTCH® performance flatback tape (3M, 2525) was then applied over the crosshatch pattern, pressed down firmly, and then rapidly pulled away from coating in a direction perpendicular to the coating surface. Application and removal of fresh tape was then repeated two additional times. Adhesion is rated as follows (0 is the best adhesion, 1-4 is in the middle, and 5 is the poorest adhesion):

TABLE 1

| Adhesion score | Squares removed | Area % left intact |
|---|---|---|
| 0 | 0 | 100 |
| 1 | <1 | >96 |
| 2 | 1 to 4 | 96-84 |
| 3 | >4 to 9 | 83-64 |
| 4 | >9 to 16 | 63-36 |
| 5 | >16 | <36 | b) Haze Value, Tv and Thickness

The haze value of the final optical article was measured by light transmission utilizing the Haze-Guard Plus haze meter from BYK-Gardner (a color difference meter) according to the method of ASTM D1003-00, which is incorporated herein in its entirety by reference. All references to "haze" values in this application are by this standard. The instrument was first calibrated according to the manufacturer's directions. Next, the sample was placed on the transmission light beam of the pre-calibrated meter and the haze value was recorded from three different specimen locations and averaged. Tv was measured using the same device.

Thickness of the films was evaluated by ellipsometer (thickness<1 μm) equipped with M-44™, EC-270 and LPS-400 with 75W Xenon Light Source from J. A. Woollam Co. Inc. or with a Metricon Model 2010 Prism Coupler apparatus (thickness>1 μm) from Metricon Corporation.

c) Fog Test

Fog test used in the examples is a breath test under 23° C. with 50% RH. Immediately after breathing, the lenses are visually inspected by the naked eye. Vision tests were at a distance of 5 meters away of target lines (6 lines of acuity from 3/10 to 14/10). They are classified in 4 categories:

No fog—no appearance of fog rated 1;

Slight fog—very little fog with clear vision and low distortion of acuity 6/10 rated 2;

Some Fog—fog with low contrast vision and moderate distortion of acuity 6/10 rated 3;

Fog—very foggy without any vision of texts or with severe distortion rated 4.

d) Hand Wiping Fog Test:

A coated substrate was hand-wiped with micro fiber cloth for 20 strokes in back and forth directions. Then after 60s, the same fog test was conducted shown as (c).

e) Adhesion Test (Rubbing Test):

A force of 60 Newtons is applied on the front convex lens surface with a isopropyl alcohol dampened cloth covered eraser. After 10 strokes the lens was wiped off with soft cloth and then breathed upon. If the area rubbed had equal or better anti-fog performance than surrounding area, the lens is continued to be wiped an additional 10 more strokes and the process of checking repeated. If the area rubbed was equal to the uncoated region of the lens the lens then failed at the set of wipes it currently completed.

The features of the cloth and the eraser are mentioned in WO 99/49097 in the description of the N×10 blows test.

2. Experimental Details

A) General Considerations

General LbL process was applied to prepare an anti-fog coating:
I. Both sides of a lens substrate were treated with corona for 30 s using Corona Treatment System (MultiDyne™ 2) or caustic solution (0.5 wt % NaOH) ultrasonic for 5 min;
II. The lens was first dipped in a polycation solution, followed with an agitated rinsing step in two deionized (DI) water baths, and then dipped in a polyanion solution, followed with an agitated rinsing step in two DI water baths.
III. Process II was repeated for (n-1) times to get a coating with n bilayers: (polycation/polyinion)$_n$.
IV. The coated lens was finally cured at 100-120° C. for 1 h.

B) Preparation of Coated Optical Articles

The optical articles used in the examples were round lenses (piano or −2.00 with a diameter of 68 mm) comprising an ORMA® lens substrate (obtained by polymerizing CR-39® diethylene glycol bis(allyl carbonate) monomer).

C) Preparation Process of Anti-Fog Coatings:

C1-Preparation of Anti-Fog Coating AF1, (ApSiO$_2$/PAA)$_{10}$

ApSiO$_2$: Aminopropyl functionalized silica nanoparticles, 15 nm, 3.0 w/v % from Aldrich PAA: Poly(acrylic acid), Mw=70,000 from Aldrich The concentrations of solutions were: 0.03 wt % for ApSiO$_2$ and 0.01M for PAA. All solutions including the deionized water baths were titrated down to pH 3.0 using 0.1N HCl.

Both sides of a lens substrate were treated with corona. The dipping time in material solutions was 2 min. There were 6 sequential dips in the first water bath and 3 sequential dips in the second water bath. The coated lens was cured at 120° C. for 1 h. In this experiment, the coating bilayers were fixed as 10 bilayers with a thickness ranging from 85 nm to 110 nm depending on different substrates, measured by ellipsometer.

C2-Preparation of Anti-Fog Coating AF2, (PDAC/SiO$_2$)$_{10}$

PDAC: Poly(diallyidimethylammonium chloride) solution, Mw=100,000-200,000, 20 wt % in water from Aldrich
SiO$_2$: A2034 solution, 32-34 wt % from EKA Chemicals The concentrations of solutions were: 0.01M for PDAC and 0.03 wt % for silica nanoparticles. The pH of PDAC solution was 4.0; the pH of SiO$_2$ nanoparticles was 9.0 and the pH of the deionized water baths was directly used at the pH of 6.0-8.0.

Both sides of a lens substrate were treated with corona. The dipping time in material solutions was 2 min. There were 6 sequential dips in the first water bath and 3 sequential dips in the second water bath. The coated lens was cured at 120° C. for 1 h. In this experiment, the coating bilayers were fixed as 10 bilayers with a thickness ranging from 85 nm to 110 nm depending on different substrates, measured by ellipsometer.

Example 1

1.1—Preparation of the Lens Substrate Coated with the Intermediate Coating (Lens Substrate S1 and S2):

1.1.1—Preparation of Solutions A and B for the Intermediate Coating.

The components of solutions A and B shown in table 1 below were prepared by adding γ-glycidoxypropyltrimethoxysilane (Glymo), KBE-402 (γ-glycidoxypropylmethyldiethoxysilane (GD)), 0.1N HCl and catalyst Al(AcAc)$_3$ under mixing. After mixing about 30 minutes, the rest of materials and glycerol propoxylate triglycidyl ether (GPTE) were added into the mixture for another 3 hours.

TABLE 1

| Intermediate coating formulation | A: Weight (g) | B: Weight (g) |
|---|---|---|
| Glymo | 43.25 | 43.25 |
| GD (KBE-402) | 128.75 | 128.75 |
| 0.1 N HCl | 28.25 | 28.25 |
| Al(AcAc)3 | 2.00 | 2.00 |
| MA-ST-HV (30-31 wt % solids) | 197.75 | 0 |
| Dowanol PM | 42.00 | 141.5 |
| Methanol | 40.00 | 138.25 |
| EFKA 3034 | 0.50 | 0.50 |
| GPTE | 15.00 | 15.00 |
| Tinuvin 1130 | 2.50 | 2.50 |

1.1.2.—Application of the Solutions on the Lens Substrate.

A bare Orma® lens was first air blowed then corona treated. Then the lens was dipped in the solution A. The dipping withdrawal speed is 3.67 mm/s. The resulting lens was then precured at 90° C. for 15 min and finally cured at 1260° C. for 4 h, leading to lens substrates S1.

The thickness of the dry coating such obtained is 6.0 µm±0.5 µm.

The crosshatch test showed excellent adhesion of this coating to the Orma® lens substrate.

The same deposition process was reproduced using another bare Orma® lens and solution B instead of solution A, leading to lens substrate S2.

1.1.3—Application of the Anti-Fog Coating AF1

Lenses S1 and S2 obtained in 1.1.2 above were finally dipped with a LbL coating AF1 as described above.

Bare Orma® lenses were used as comparison examples.

TABLE 2

| Example | Lens substrate | Anti-fog coating | T, % | Haze, % | Initial fog test | Fog test after hand wiping | Adhesion (Rubbing test) |
|---|---|---|---|---|---|---|---|
| 1 | S1 from solution A | AF1 | 87.2 | 3.42 | 2 | 2 | Passed 120 strokes |
| 2 | S2 from solution B | AF1* | 92.8 | 0.37 | 1 | 1 | Scratches after 30 strokes |
| Comparative CE1 | Bare Orma (Comparison 1) | AF1 | 92.3 | 1.07 | 2 | 3 | Removed by 30 strokes |

*(same process as described for AF1, except pH = 4.0 of all solutions in the LbL process.

Example 3

In this example, a primer layer was applied on the lens substrate, before application of the intermediate coating.

A bare (i.e. without any coating) polycarbonate (PC) lens was first dipped in 5 wt % of aminopropyl triethoxysilane/water and dried at 75° C. for 15 min, then dipped in the solution A and cured according to the same procedure as example 1.

The following coating procedure was same as Example 1, i.e. the deposition of the intermediate coating from solution A, leading to a lens S3 which is a lens substrate having, in this order, from the surface of the substrate, an aminosilane primer and the intermediate coating.

A bare PC lens was used as comparison examples.

TABLE 3

| Example | Lens substrate | T, % | Haze, % | Initial fog test | Fog test after hand wiping | Adhesion (Rubbing test) |
|---|---|---|---|---|---|---|
| 3 | S3 | 91.4 | 0.50 | 1 | 2 | Passed 120 strokes |
| Comparative example CE2 | Bare PC lens | 91.2 | 1.46 | 3 | 4 | Removed by 30 strokes |

Examples 4 to 7 and Comparative Example 3

In these examples, the thickness of the intermediate coating was varied.

Four solutions C, D, E and F shown below were prepared, by diluting solution A of example 1, so that solutions C, D, E and F contains respectively 5%, 10%, 20%, and 30% of solution A.

TABLE 4

| | Weight (g) | | | |
|---|---|---|---|---|
| Solution | C | D | E | F |
| A | 5 | 10 | 20 | 30 |
| Dowanol PM™ | 49.875 | 47.25 | 42.00 | 36.75 |
| Methanol | 45.125 | 42.75 | 38.00 | 33.25 |

The convex sides of PC Airwear® lenses (these lenses have an abrasion-resistant coating based on hydrolyzed alkoxysilanes) were treated with corona and then spin-coated at a speed of 800-1000 rpm with solution B, C, D and E, respectively. Each sample was pre-cured at 90° C. for 15 minutes and post-cured at 126° C. for 4 h, thereby obtaining respectively lens substrates S4, S5, S6 and S7. The features of the obtained lens substrates are mentioned in table 5. The adhesion of the intermediate coating on PC Airwear® is excellent.

TABLE 5

| Lens substrate | Base substrate | Intermediate coating solution | Thickness of intermediate coating | T, % | Haze | Adhesion (Crosshatch test) |
|---|---|---|---|---|---|---|
| S4 | PC Airwear ® | C | 0.128 μm | 91.3 | 0.18 | 0 |
| S5 | PC Airwear ® | D | 0.280 μm | 91.4 | 0.15 | 0 |
| S6 | PC Airwear ® | E | 0.679 μm | 91.3 | 0.14 | 0 |
| S7 | PC Airwear ® | F | 1.095 μm | 91.4 | 0.13 | 0 |

Then the anti-fog coating AF1 was applied on each of these substrates following the preparation process C1. The resulting lenses were evaluated. Table 6 hereafter summarizes the results. PC Airwear®) lens were used as comparison example.

TABLE 6

| Example | Lens substrate | Anti-fog coating applied | T, % | Haze, % | Initial fog test | Fog test after hand wiping | Adhesion (Rubbing test) |
|---|---|---|---|---|---|---|---|
| 4 | S4 | AF1 | 91.2 | 1.03 | 3 | 4 | Passed 120 strokes |
| 5 | S5 | AF1 | 90.7 | 1.56 | 2 | 3 | Passed 120 strokes |
| 6 | S6 | AF1 | 91.5 | 0.59 | 2 | 2 | Passed 120 strokes |
| 7 | S7 | AF1 | 91.1 | 1.07 | 2 | 2 | Passed 120 strokes |
| Comparative example CE3 | PC Airwear ® | AF1 | 88.7 | 0.43 | 2 | 4 | Removed by 90 strokes |

Examples 8 to 10 and Comparative Example CE4

In these examples, different intermediate liquid compositions having different concentrations of epoxy monomers are used.

Four solutions for the preparation of the intermediate coating: comparison 4, G, H and I shown in table 7 below were prepared through the same procedure as Example 1, but with different concentrations of GPTE.

TABLE 7

| Weight (g) | Comparison 4 | G* | H | I |
|---|---|---|---|---|
| Glymo | 4.325 | 4.325 | 4.325 | 4.325 |
| KBE-402 | 12.875 | 12.875 | 12.875 | 12.875 |
| 0.1 N HCl | 2.825 | 2.825 | 2.825 | 2.825 |
| Al(AcAc)$_3$ | 0.20 | 0.20 | 0.20 | 0.20 |
| MA-ST-HV | 19.775 | 19.775 | 19.775 | 19.775 |
| Dowanol PM | 237.00 | 236.25 | 235.5 | 234.75 |
| Methanol | 222.70 | 221.95 | 221.2 | 220.45 |
| EFKA 3034 | 0.05 | 0.05 | 0.05 | 0.05 |
| GPTE | 0 | 1.50 | 3.00 | 4.50 |
| Tinuvin 1130 | 0.25 | 0.25 | 0.25 | 0.25 |

*The composition of dry extract weight of the coating solution F is equivalent to that of the coating solution A.

Several PC Airwear® lenses from Essilor were coated with the intermediate coating on their convex side. They were first treated with corona and then spin-coated at a speed of 800-1000 rpm with solutions G, H, I, and solution Comparison 4, thereby obtaining respectively coated lens substrates S8, S9, S10, and SCE4. The sample was pre-cured at 90° C. for 15 minutes and post-cured at 126° C. for 4 h.

Then the anti-fog coating AF1 is applied on each of these substrates following the preparation process C1.

Properties and features of the obtained anti-fog lens substrates are summarized in table hereafter.

TABLE 8

| Example | Lens substrate | Anti-fog coating applied | T, % | Haze, % | Initial fog test | Fog test after hand wiping | Adhesion (Rubbing test) |
|---|---|---|---|---|---|---|---|
| 8 | S8 | AF1 | 90.7 | 1.57 | 2 | 2 | Passed 120 strokes |
| 9 | S9 | AF1 | 89.5 | 3.43 | 2 | 2 | Passed 120 strokes |

TABLE 8-continued

| Example | Lens substrate | Anti-fog coating applied | T, % | Haze, % | Initial fog test | Fog test after hand wiping | Adhesion (Rubbing test) |
|---|---|---|---|---|---|---|---|
| 10 | S10 | AF1 | 90.3 | 2.97 | 1 | 1 | Passed 120 strokes |
| Comparative example CE4 | SCE4 | AF1 | 91.1 | 1.05 | 3 | 4 | Removed by 90 strokes |

Examples 11 to 13 and Comparative Example CE5 to CE7

Applications to Other Hard Coated Plastic Substrates

The solution E used for the preparation of intermediate coating of example 5 was applied to several hard coated lenses: Orma® with a hard coating corresponding to the coating of example 3 of EP614,957,
1.6 polythiourethane (PTU) substrate coated with an abrasion resistant coating comprising a hydrolyzate of an epoxyalkoxysilane and a high index colloid and 1.67 polythiourethane (PTU) substrate coated with an abrasion resistant coating comprising a hydrolyzate of an epoxyalkoxysilane and a high index colloid, designated respectively as substrate S11, S12 and S13.

In each case, a lens without the intermediate layer was used as the comparison example.

All coating substrates were dipped with AF1 according to the procedure shown before in C1.

TABLE 9

| Example | Lens substrate | Anti-fog coating | T, % | Haze, % | Initial fog test | Fog test after hand wiping | Adhesion (Rubbing test) |
|---|---|---|---|---|---|---|---|
| 11 | S11 | AF1 | 89.6 | 2.85 | 2 | 2 | Passed 120 strokes |
| CE5 | Hard coated Orma ® | AF1 | 90.1 | 2.60 | 4 | 4 | Removed by 60 strokes |
| 12 | S12 | AF1 | 88.9 | 2.88 | 1 | 2 | Passed 120 strokes |
| CE6 | Hard coated PTU 1.6 | AF1 | 89.7 | 2.72 | 4 | 4 | Removed by 30 strokes |
| 13 | S13 | AF1 | 88.8 | 2.40 | 2 | 2 | Passed 120 strokes |
| CE7 | Hard coated PTU 1.67 | AF1 | 91.8 | 1.17 | 4 | 4 | Removed by 30 strokes |

Examples 14 to 17 and Comparative Experiment CE8

In these examples, the anti-fog coating AF2 is applied.

The convex sides of PC Airwear® lenses were treated with corona and then spin-coated at the speed of 800-1000 rpm with an intermediate coating solution C, D E or F, respectively (as used in previous examples 4 to 7) according to the same process described in Example 4, leading respectively to lens substrates S14, S15, S16, S17. Then anti-fog coating AF2 is applied as described in C2 above. PC Airwear® lens was used as a comparison example.

TABLE 10

| Examples | Lens substrate | Anti-fog coating applied | Initial fog test | Fog test after hand wiping | Adhesion after hand wiping |
|---|---|---|---|---|---|
| 14 | S14 | AF2 | 3 | 4 | Coating remained with some visual scratches |

TABLE 10-continued

| Examples | Lens substrate | Anti-fog coating applied | Initial fog test | Fog test after hand wiping | Adhesion after hand wiping |
|---|---|---|---|---|---|
| 15 | S15 | AF2 | 2 | 3 | Coating remained with partial visual scratches |
| 16 | S16 | AF2 | 2 | 3 | Coating remained with small visual scratches |
| 17 | S17 | AF2 | 2 | 3 | Coating remained without visual scratches |
| CE8 | PC Airwear ® | AF2 | 3 | 4 | Completely removed |

Examples 18 to 20 and Comparative Example 9

Three solutions J, K, and L shown below in table 11 were prepared through the same procedure as Example 1, but with different epoxy monomers.

TABLE 11

| Weight (g) | J | K | L |
|---|---|---|---|
| Glymo | 25.95 | 25.95 | 25.95 |
| KBE-402 | 77.25 | 77.25 | 77.25 |
| 0.1 N HCl | 16.95 | 16.95 | 16.95 |
| Al(AcAc)$_3$ | 1.2 | 1.2 | 1.2 |
| MA-ST-HV | 118.65 | 118.65 | 118.65 |
| Dowanol PM | 20.7 | 20.7 | 20.7 |
| Methanol | 19.5 | 19.5 | 19.5 |
| EFKA 3034 | 0.3 | 0.3 | 0.3 |
| Epoxy | 18* | 18** | 18*** |
| Tinuvin 1130 | 1.5 | 1.5 | 1.5 |

*EGDE: Ethylene glycol diglycidyl ether
**TMPTGE: Trimethylol propane triglycidyl ether
***GDE: Glycerol diglycidyl ether Both sides of Orma® lenses were treated with corona and then dip-coated in the solution J K, or L, leading respectively to corresponding lens substrates S18, S19 and S20. The dipping speed was 110 mm for 35 seconds. The lens substrates were pre-cured at 90° C. for 15 minutes and post-cured at 126° C. for 4 h. The thickness of dry intermediate coatings made from J, K, or L corresponding respectively to lens substrates S18, S19 and S20 are 6.7±0.5 µm. After the coatings cooled down, both sides of lenses were treated with corona and deposited with AF2 as described in point C2 before. Orma® lens coated with AF2 was used as a comparison example From the previous examples, it appears that the intermediate coating fulfills two different functions:
1) The intermediate coating of the invention increases the anti-fog properties of the anti-fog LbL coating deposited thereon (in comparison to lens substrates treated with the same anti-fog LbL coating applied directly on the substrate that does not comprise the intermediate coating).
This is an immediate effect, i.e. it can be seen immediately after preparation of the anti-fog lens substrate.
2) The intermediate coating of the invention improves mechanical durability of the anti-fog coating.

It also appears that ApSiO$_2$/PAA coatings have stronger adhesion than PDAC/SiO$_2$ coatings on the tested lens substrates.

Thus the rubbing test (N×10 blows) which is more severe than hand wiping was applied for ApSiO2/PAA coatings and the hand wiping test for PDAC/SiO$_2$ coatings, in order to distinguish the difference of coating adhesion.

Overall, adhesion and antifog improvements of the LbL coatings was also observed using intermediate layer formulated without nanoparticles.

The invention claimed is:
1. A process for preparing an article having anti-fog properties, comprising:
a) providing a substrate having at least one main surface coated with an intermediate coating obtained by applying and at least partially curing an intermediate coating composition comprising at least one monoepoxysilane and/or an hydrolyzate thereof and at least one polyepoxy monomer comprising at least two epoxy groups;
b) forming onto said intermediate coating at least one bi-layer obtained by:

TABLE 12

| Example | Lens substrate | Anti-fog coating applied | T, % | Haze, % | Initial fog test | Fog test after hand wiping | Adhesion after hand wiping |
|---|---|---|---|---|---|---|---|
| 18 | S18 | AF2 | 94.2 | 0.28 | 2 | 2 | Coating remained with no visual scratches |
| 19 | S19 | AF2 | 94.2 | 0.28 | 2 | 3 | Coating remained with no visual scratches |
| 20 | S20 | AF2 | 95.3 | 0.31 | 2 | 3 | Coating remained with no visual scratches |
| CE9 | Orma ® | AF2 | 94.6 | 0.31 | 2 | 4 | Coating remained with many visual scratches | b1—forming a first layer by applying a first layer composition on said intermediate coating, said first layer composition comprising at least one compound A having a first electric charge, b2—forming a second layer by applying a second layer composition directly on said first layer, said second layer composition comprising at least one compound B having a second electric charge which is opposite to said first electric charge, compounds A and B being independently chosen from polyelectrolytes, $SiO_2$ nanoparticles comprising ionic groups and $TiO_2$ nanoparticles comprising ionic groups, with the proviso that at least one of said first and said second layer comprises $SiO_2$ nanoparticles comprising ionic groups and/or $TiO_2$ nanoparticles comprising ionic groups; and c) curing said at least one bi-layer by heating at a temperature of 150° C. or less, at atmospheric pressure and in the absence of added water steam.

2. The process of claim 1, wherein at least one of said first and said second layer comprises $SiO_2$ nanoparticles comprising ionic groups.

3. The process of claim 1, wherein the at least one bi-layer is cured by heating at a temperature of 120° C. or less, at atmospheric pressure and in the absence of added water steam.

4. The process of claim 1, wherein one of the layers of said at least one bi-layer comprises $SiO_2$ nanoparticles comprising ionic groups and the other layer of said at least one bi-layer comprises at least one oppositely charged polyelectrolyte.

5. The process of claim 4, wherein the $SiO_2$ nanoparticles comprising ionic groups are positively charged.

6. The process of claim 5, wherein the $SiO_2$ nanoparticles comprising ionic groups are obtained from nanoparticles functionalized by amino groups.

7. The process of claim 6, wherein the $SiO_2$ nanoparticles comprising ionic groups are obtained from 3-aminopropylsilane modified $SiO_2$ nanoparticles.

8. The process of claim 5, wherein the polyelectrolyte is negatively charged.

9. The process of claim 8, wherein the polyelectrolyte is obtained from a polymer further defined as a polyacrylic acid, sulfonated polystyrene, sulfonated polyvinylic compound or a mixture thereof.

10. The process of claim 4, wherein the $SiO_2$ nanoparticles comprising ionic groups are negatively charged.

11. The process of claim 10, wherein the polyelectrolyte is positively charged.

12. The process of claim 11, wherein the polyelectrolyte is a polymer further defined as a poly(diallyl dimethylammonium chloride), poly(allylamine hydrochloride), poly(4-vinylbenzyltrimethyl ammonium chloride) or a mixture thereof.

13. The process of claim 1, wherein the monoepoxysilane is a compound of formula:

$$R_{n'}YSi(X)_{3-n'} \qquad (I)$$

or a hydrolyzate thereof, in which the R groups are identical or different and represent monovalent organic groups linked to the silicon atom through a carbon atom, Y is a monovalent organic group linked to the silicon atom through a carbon atom and containing one epoxy function, the X groups are identical or different and represent hydrolyzable groups or hydrogen atoms, and n' is 0 or 1.

14. The process of claim 1, wherein the polyepoxy monomer is further defined as a glycerol propoxylate triglycidyl ether, trimethylolpropane triglycidyl ether, or a mixture thereof.

15. The process of claim 1, wherein the polyepoxy monomer has two to four epoxy groups.

16. The process of claim 15, wherein the polyepoxy monomer is present in the intermediate coating composition in an amount ranging from 0.5 to 40% by weight relative to the weight of the dry extract of said intermediate coating composition.

17. The process of claim 1, wherein said intermediate coating composition further comprises at least one inorganic filler.

18. The process of claim 1, wherein the thickness of said intermediate coating ranges from 50 nm to 20 microns.

19. The process of claim 1, wherein each layer of said at least one bi-layer is rinsed with an aqueous rinsing solution after having been deposited.

20. The process of claim 1, wherein the intermediate coating is coated with a plurality of said bi-layers stacked onto each other, with the proviso that the second electric charge of the at least one compound B comprised in the second layer of each bi-layer is opposite to the first electric charge of the at least one compound A comprised in the first layer of the subsequent bi-layer.

* * * * *

UNITED STATES PATENT AND TRADEMARK OFFICE
CERTIFICATE OF CORRECTION

PATENT NO. : 8,187,676 B2
APPLICATION NO. : 12/472971
DATED : May 29, 2012
INVENTOR(S) : Zheng et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 445 days.

Signed and Sealed this
Twenty-eighth Day of August, 2012

David J. Kappos
*Director of the United States Patent and Trademark Office*